Patented Aug. 23, 1949

2,480,009

UNITED STATES PATENT OFFICE 2,480,009

CHLORINATED POLYETHYLENE ELECTRICAL INSULATING COMPOSITIONS

David Adams Fletcher, Pittsburgh, Pa., assignor to E. I. du Pont de Nemours & Company, Wilmington, Del., a corporation of Delaware No Drawing. Application August 24, 1948, Serial No. 45,977

3 Claims. (Cl. 260—41)

This invention relates to improved chlorinated polyethylene compositions and more particularly it relates to improved polyethylene compositions exhibiting a combination of new and improved properties which render the said compositions readily adaptable as thermoplastic electrical insulating materials.

The polyethylene within the comprehension of this invention is the normally solid polymers of ethylene and the process for making the same as described by Fawcett et al. U. S. 2,153,553. These polymers are tough solids at normal temperatures with a melting point about 212° F.–250° F., corresponding in composition substantially to $(CH_2)_x$, and show a crystalline structure by X-ray diffraction. The chlorinated polyethylene suitable for use in this invention is produced by chlorinating the normal solid polymers of ethylene mentioned above and more specifically by chlorinating polyethylene having an average molecular weight of between 10,000 and 30,000. The said average molecular weight of the polyethylene suitable for chlorination in accordance with this invention is determined by measuring the viscosity of dilute solutions of the ethylene polymer in accordance with a method described by Staudinger in Zeitsch. Phys. Chem., vol. 171A, page 129 (1934), except that the following solvent, concentration and constant were used. The viscosity was determined in a viscosimeter having a capillary bore of such size that a pure xylene charge would flow through the tube at 85° C. in a minimum of 100 seconds. A dilute solution of the polyethylene was prepared consisting of 0.0012 part by weight of polyethylene dissolved in 0.9988 part by weight of pure xylene (i. e., ⅛%  solution). The viscosity of the pure xylene was compared with the viscosity of the ⅛% solution of polyethylene in xylene. The comparison was made under the same conditions at 85° C. The average molecular weight was calculated as follows:

Average molecular weight=
(relative viscosity−1) × 134,000, where the relative viscosity is equal to:

$$\frac{\text{viscosity of polymer solution}}{\text{viscosity of pure solvent}}$$

The chlorination of the said polyethylene is accomplished by chlorinating fine divided uncompacted particles of polyethylene, the said polyethylene particles being dispersed in water and followed by sufficient chlorination to yield a chlorinated polyethylene containing approximately between 20% and 35% by weight of chlorine. The said chlorination procedure is more fully described in U. S. copending application Ser. No. 686,149, filed July 25, 1946 in the name of Robert S. Taylor.

The art has taught heretofore that polyethylene and chlorinated polyethylene may have imparted thereto improved electrical conductivity, tensile strength and hardness properties. These properties are imparted to the said polymers by incorporating therein from 25 to 60 parts of particular non-thermal carbon blacks per 100 parts of polymer present. The particular carbon blacks known to impart the said properties are channel blacks, acetylene blacks and lamp blacks.

It has been further taught that the incorporation of various finely divided carbon blacks into highly plasticized polymeric vinyl chloride resins results in tough, resilient and elastic compositions which are electrically conductive. It has also been described that as the proportion of carbon black in the said polymeric vinyl chloride resins is increased from 20 to 40% based on the weight of the total composition, the conductivity increases rapidly which is in effect expresses the fact that D. C. volume resistivity decreases rapidly. These vinyl resin compositions are unsuitable for certain electrical insulating applications chiefly because of this low volume resistivity property.

The art has not heretofore taught a method of making chlorinated polyethylene compositions which are suitable for the fabrication into thermoplastic insulation which is within the Underwriters' specifications. Polyethylene per se is unsatisfactory because it fails to comply with the Underwriters' flame retardant specification.

In order that thermoplastic compositions be adaptable for the electrical insulation of wires and the construction of cables which are to be employed at high, as well as low frequencies, additional properties are of the utmost importance and desirability. Consequently, for example, in a low frequency (60 cycles), low power (less than 600 volts), thermoplastic electrical insulation for the conventional house to street wire, the Underwriters' Laboratories Inc. specifies certain minimum standards of flame retardant properties, flexibility at subzero tempertures, insulation resistance and volume resistivity and stiffness. These and other standardized tests are described in the Underwriters' Laboratories Inc. booklet entitled "Standard for Thermoplastic Insulated Wires," second edition, March 1945. The chlorinated polyethylene known in the art does not possess sufficient flame retardant properties to qualify under the above mentioned Underwriters' specifications.

An object of this invention is the production of thermoplastic electrical insulating compositions which are characterized by and possessed of certain electrical insulating properties and suitable for practical use at low as well as high electrical frequencies. Another object of this invention is to produce a new and improved thermoplastic insulation composition from chlorinated polyethylene and suitable as an insulation on electrical wires, cables, and the like. Other objects will be apparent from the detailed description of the invention and examples hereinafter set forth.

The above objects are accomplished in accordance with this invention by providing compositions comprising chlorinated polyethylene containing from 20% to 35% by weight chlorine and from 65 to 100 parts by weight of a thermal carbon black per 100 parts by weight of the said chlorinated polyethylene.

In the practice of this invention any thermal carbon black may be used. Thermal carbon blacks are those carbon blacks that are obtained by the thermal decomposition or cracking of natural gas under suitable temperature and pressure conditions, and which is more fully described in the art by Gallie, "Petroleum Processing," pp. 199–202, (Nov., 1946). The particle size of the said thermal carbon blacks for use in this invention has not been found to be critical. However, it is preferred that the particle size range between 50 and 300 millimicrons. Particle size measurements as herein referred to were determined by the use of an electron microscope, and should be understood to mean average particle size.

In order to provide thermoplastic compositions having the most desirable electrical insulation properties, chlorinated polyethylene produced in accordance with the process disclosed in U. S. patent application Ser. No. 686,149, filed July 25, 1946, in the name of Robert S. Taylor should be employed, the said chlorinated polyethylene containing from 20% to 35% by weight of chlorine. The chlorinated polyethylenes having from 20% to 35% by weight of chlorine when mixed with the carbon blacks of this invention yield electrical insulating compositions which possess the optimum combination of electrical insulating properties.

In practicing this invention, any conventional means of mixing the chlorinated polyethylene and thermal carbon black may be used providing that an adequate mixing of the ingredients is obtained in order to give a homogeneous dispersion of the carbon black in the polymer. Thus the carbon black may be added to the chlorinated polyethylene on hot rolls and the mixture rolled, usually at a temperature of 110° C. to 145° C., until a homogeneous mass is obtained. Alternatively, the carbon black may be wet with a non-solvent for the polymer (e. g., alcohol) and subsequently mixed with the chlorinated polyethylene. The carbon black and the chlorinated polyethylene may also be incorporated together at elevated temperatures in a Banbury mixer, a Day mixer, a plasticator, a screw stuffer or plastic extruder, and the like.

Small proportions of other additives may be mixed with the compositions of this invention such as fillers, toners, anti-oxidants (phenothiazine, menthyl phenol, octyl phenol), metal deactivators, acid scavengers (beta-naphthyl glycidyl ether, oxazolines, oxazolidines, also benzimidazoles, glycerol, glyceryl monolaurate, dicyandiamide and glysidyl laurate), light stabilizers, lubricants and waxes (aluminum stearate, refined paraffin waxes), plasticizers, anti-blocking agents, (stearamide, stearonitrile), mixtures of an acid scavenger and an antioxidant glyceryl monolaurate and menthyl phenol, dicyandiamide and octyl phenol) and the like. These additional additives may be incorporated into the composition of this invention provided that the additional ingredients are not used in such a proportion that they alter the combination of highly desirable properties posessed by the composition of this invention.

The following examples in which all parts are by weight unless otherwise specified, more clearly illustrate specific embodiments of the subject invention.

*Example I*

A composition comprising the following ingredients was prepared. 95 parts of chlorinated polyethylene produced from polyethylene having an average molecular weight of from 18,000 to 20,000 determined in accordance with the procedure heretofore described and the said polymer containing approximately 27% by weight of chlorine having been chlorinated in acordance with the method referred to above; 5.3 parts by weight of aluminum monostearate per 100 parts by weight of chlorinated polyethylene; 2.1 parts of dicyandiamide per 100 parts of chlorinated polyethylene and 74 parts of thermal carbon black per 100 parts of chlorinated polyethylene, the said thermal carbon black having a particle size of 76 millimicrons. The composition ingredients were premixed dry and compounded in a No. 00 Banbury mixer for 10 minutes at 135° C. The resulting product was cut to $\frac{1}{8}$ inch in a Ball and Jewel cutter, this $\frac{1}{8}$ inch material was extruded on a No. 14 AWG soft annealed copper wire to give an insulation thickness of 0.031 inch. The extrusion was carried out by means of a No. 1 Royal extruder, oil-heated, and containing a cross-head. The extruder die temperature was 166° C., cross-head temperature 149° C. and a collar temperature of 135° C. This extruded insulation demonstrated a D. C. volume resistivity of $7.2 \times 10^{14}$ ohms-cms. at 15.5° C. This thermal black modified insulating material satisfactorily met the Underwriters' flame retardance specification as well as adequately qualifying under the Underwriters' flexibility test at −10° C. This composition was compression molded between nickel-plated platen sheets at 160° C. into slabs of 0.065 inch thickness, a specimen of which exhibited a stiffness of 14.050 pounds per square inch.

*Example II*

A composition comprising the following ingredients was prepared. 95 parts of chlorinated polyethylene produced from polyethylene having an average molecular weight of from 18,000 to 20,000 determined in accordance with the procedure heretofore described, and the said polymer containing approximately 27% by weight of chlorine having been chlorinated in accordance with the method referred to above; 5.3 parts by weight of aluminum monostearate per 100 parts of chlorinated polyethylene; 2.1 parts of dicyandiamide per 100 parts of chlorinated polyethylene and 99 parts of thermal carbon black per 100 parts of chlorinated polyethylene, the said thermal carbon black having a particle size of 76 millimicrons. This composition was prepared by premixing dry, compounding in a Banbury mixer, cutting, extruding and compression molding in exactly the same manner as described in Example I. The compression molded specimen exhibited a stiffness of 18,400 p. s. i. The extruded insulation exhibited a D. C. volume resistivity of $7.5 \times 10^{13}$ ohm-cms. at 15.5° C. This thermal carbon black modified thermoplastic insulation material satisfactorily satisfied the Underwriters' flame retardant specifications as well as adequately qualifying under the Underwriters' flexibility test at −10° C.

*Example III*

A composition comprising the following composition was prepared. 95 parts of chlorinated polyethylene produced from polyethylene having an average molecular weight of from 18,000 to 20,000 determined in accordance with the procedure heretofore described and the said polymer containing approximately 27% by weight of chlorine having been chlorinated in accordance with the method referred to above; 5.3 parts by weight of aluminum monostearate per 100 parts by weight of chlorinated polyethylene; 2.1 parts of dicyandiamide per 100 parts of chlorinated polyethylene and 99 parts per 100 parts of chlorinated polyethylene present of thermal carbon black having a particle size of 270 millimicrons. This composition was prepared by having the chlorinated polyethylene, the aluminum monostearate and the dicyandiamide form a band at 121° to 132° C. upon a 16 inch, two-roll, even speed mill. The above amount of carbon black was wet sufficiently with alcohol so as to form a cake in order to eliminate dusting. The said thermal carbon black alcohol cake was added to the components of the composition by working the same into the chlorinated polyethylene, aluminum monostearate and dicyandiamide on the above mentioned mill rolls. The alcohol evaporated rapidly from the batch during the rolling operation. Subsequently to the dispersion of the thermal carbon black into the chlorinated polyethylene composition which required approximately 10 minutes in rolling time, the composition containing the thermal carbon black was removed from the rolls, allowed to cool and cut to $\frac{1}{16}$ inch in a Ball and Jewel cutter. The composition was then extruded upon No. 14 AWG soft annealed copper wire to 0.031 inch thickness and compression molded into slabs as described in Example I. This composition upon testing indicated a stiffness of 18,600 p. s. i. and satisfactorily met the Underwriters' specification as to flame retardance properties as well as adequately meeting the Underwriters' flexibility test at −10° C. The D. C. volume resistivity was $5.5 \times 10^{14}$ measured in ohm-cms. at 15.5° C.

*Example IV*

A composition comprising the following ingredients was prepared. 95 parts of chlorinated polyethylene produced from polyethylene having an average molecular weight of from 18,000 to 20,000 determined in accordance with the procedure heretofore described and the said polymer containing approximately 27% by weight of chlorine having been chlorinated in accordance with the method referred to above; 5.3 parts by weight of aluminum monostearate per 100 parts by weight of chlorinated polyethylene; 2.1 parts of dicyandiamide per 100 parts of chlorinated polyethylene and 99 parts per 100 parts of chlorinated polyethylene of thermal carbon black, the said thermal carbon black having a particle size of 274 millimicrons. The production of this composition was accomplished in accordance with the procedure set forth in Example III and was likewise cut, extruded and molded as therein expressed. This particular composition exhibited a stiffness of 18,735 p. s. i. and satisfactorily qualified in accordance with the Underwriters' flame retardance and flexibility at −10° C. specifications. The D. C. volume resistivity in ohm-cms. at 15.5° C. was $1.2 \times 10^{14}$.

The above examples are merely illustrative of specific embodiments of the invention herein involved and are not to be construed as limitations upon the same. The invention broadly comprises the manufacture of chlorinated polyethylene compositions having homogeneously admixed therewith from 65 to 100 parts by weight of thermal carbon black per 100 parts by weight of chlorinated polyethylene.

It has been found that compositions containing the same amounts of chlorinated polyethylene, aluminum monostearate and dicyandiamide and a non-thermal carbon black in substantially the same amounts as set forth in the above examples do not possess the desirable combination of electrical and physical properties as exhibited by the compositions of this invention. The non-thermal carbon blacks herein referred to are acetylene carbon blacks, lamp blacks and channel blacks. In fact the stiffness of these non-thermal carbon black compositions increased to a magnitude of 27,950 p. s. i. and 43,635 p. s. i. and the D. C. volume resistivity in ohm-cms. at 15.5° C. was less than $10^7$. A composition containing a non-thermal carbon black within the proportions of this invention failed to pass the Underwriters' flame retardance test.

The D. C. volume resistivity heretofore referred to is determined by measuring the insulation resistance of the coated wire at 15.5° C. in accordance with the Underwriters' Laboratories specification, described in "Standard for Thermoplastic Insulated Wires," March 1945. The insulation resistance, expressed in megohms per 1,000 conductor feet, is then converted to volume resistivity, expressed in ohm-cms., since the latter term is more conventional for expressing this property of insulating compositions. The stiffness properties of the compositions hereto referred to were measured in accordance with A. S. T. M. specification D747–43T (May, 1945), using a Tinius Olsen stiffness tester.

The proportion of the thermal carbon blacks in the insulating compositions of this invention is critical. The combination of properties obtained when chlorinated polyethylene is modified with thermal carbon black in an amount of from 65 to 100 parts by weight per 100 parts of chlorinated polyethylene present is unexpected. By employing substantially 65 parts by weight of thermal carbon black per 100 parts of chlorinated polyethylene, an insulating material is obtained which merely satisfies the flame retardance test described on pages 17–19 of "Standard for Thermoplastic Insulated Wires," March 1945, and issued by the Underwriters' Laboratories Inc.. Proportions of thermal carbon black in excess of 65 parts by weight per 100 parts of chlorinated polyethylene present and not more than 100 parts by weight of the chlorinated polyethylene present passed the said flame retardance test satisfactorily. However, when thermal carbon black was incorporated into chlorinated polyethylene in an amount in excess of 100 parts by weight per 100 parts by weight of chlorinated polyethylene present the combination of electrical properties in the resulting composition are seriously impaired; i. e., the D. C. volume resistivity as measured by the method described above drops very rapidly. In addition, the toughness of the composition decreases rapidly. The use of various carbon blacks other than thermal carbon black in chlorinated polyethylene results in compositions having a stiffness as high as 32,000 to 95,000 p. s. i. at 99 parts per 100 parts of chlorinated polyethylene carbon black loadings, which results in sufficiently decreased flexibilities at low temperature to fail the Underwriters' flexibility test. The stiffness, measured in accordance with the method heretofore set forth, of compositions of this invention is sufficiently low (8,000–19,000 p. s. i.) to obtain a high degree of low temperature flexibility. The use of various channel blacks, furnace blacks, acetylene blacks and lamp blacks results in chlorinated polyethylene compositions which are not in their nature insulating. More specifically, these other types of carbon blacks when incorporated in chlorinated polyethylene in an amount of from 65 to 100 parts by weight per 100 parts of chlorinated polyethylene result in compositions which have a D. C. volume resistivity of from $10^2$ to $10^7$ ohms-cms. at 15.5° C., whereas the thermal blacks in the same proportion maintain a volume resistivity of substantially from $10^{13}$ to $10^{14}$ ohms-cms. at 15.5° C. Consequently, the compositions of this invention are of greater practical use for electrical wire and cable applications, e. g., for primary insulation for low frequency and for secondary insulation at high frequency. An additional advantage of this invention is the fact that when in a molded and extruded form the compositions have smoother surfaces than those chlorinated polyethylene compositions which have not been modified by thermal carbon black. It also appear that the thermal carbon black acts somewhat as a lubricant toward increasing the ease of extrusion and molding of said compositions.

The compositions of this invention are of greatest use in the production of flexible thermoplastic insulated wires and cables for use both at high and low frequencies. However, the compositions are also suitable for molding and extruding into a variety of shapes. The said new compositions have excellent resistance to water, oils and greases, are tough and at the same time flexible under a wide temperature range. This combination of properties together with those previously mentioned are of outstanding value for the production of articles for the electrical industry such as telephone lines, power cables, electrical tape and spaghetti tubing, coil windings, molded parts and the like. An additional advantage of these compositions is the fact that they do not contain large amounts of plasticizers which exude from and migrate as is found in the vinyl type plastic insulations heretofore used, e. g., polyvinyl chloride, vinyl chloride-vinyl acetate copolymers and the like. The new compositions of this invention are sufficiently flexible and consequently are capable of being used in the same applications in which the above mentioned vinyl compositions are used. This invention therefore provides a solution to the problem of overcoming the objectionable properties of previously known rubber, vinyl and non-modified chlorinated polyethylene compositions, particularly in electrical insulating applications.

As many different embodiments of this invention may be made without departing from the scope and spirit thereof, it is to be understood that I do not intend any limitation except as contained in the appended claims.

I claim as my invention:

1. A composition of matter comprising a chlorinated solid ethylene polymer containing from 20% to 35% by weight of chlorine; and a thermal carbon black, the said thermal carbon black being present in an amount of from 65 to 100 parts by weight per 100 parts by weight of said chlorinated ethylene polymer present in said composition.

2. A composition of matter comprising a chlorinated solid ethylene polymer containing from 20% to 35% by weight of chlorine; and from 65 to 100 parts by weight of a thermal carbon black per 100 parts of chlorinated ethylene polymer present in said composition, said thermal carbon black having a particle size of 76 millimicrons.

3. A composition of matter comprising a chlorinated solid ethylene polymer containing from 20% to 35% by weight of chlorine; and from 65 to 100 parts by weight of a thermal carbon black per 100 parts of said chlorinated ethylene polymer present in said composition, said thermal carbon black having a particle size between 50 and 300 millimicrons.

DAVID ADAMS FLETCHER.

REFERENCES CITED

The following references are of record in the file of this patent:

UNITED STATES PATENTS

| Number | Name | Date |
|---|---|---|
| 2,416,069 | Scott | Feb. 18, 1947 |

Certificate of Correction

Patent No. 2,480,009                                         August 23, 1949

DAVID ADAMS FLETCHER

It is hereby certified that errors appear in the printed specification of the above numbered patent requiring correction as follows:

Column 1, line 51, for the word "fine" read *finely*; column 2, line 25, after "which" strike out "is"; line 48, for "tempertures" read *temperatures*; column 4, line 7, for "glyceryl" read *(glyceryl*; line 57, for "14.050" read *14,050*; column 6, line 8, for "hiibted" read *hibited*; column 7, line 43, for "appear" read *appears*; and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*